(No Model.)

H. C. CANNON & A. E. McGRATH.
ADJUSTABLE BULLETIN BOARD.

No. 364,895. Patented June 14, 1887.

WITNESSES:
Fred G. Dieterich
Edw. W. Byrn.

INVENTOR:
H. C. Cannon
A. E. McGrath
BY Munn & Co
ATTORNEYS.

UNITED STATES PATENT OFFICE.

HUGH C. CANNON AND ARTHUR E. McGRATH, OF McARTHUR, OHIO.

ADJUSTABLE BULLETIN-BOARD.

SPECIFICATION forming part of Letters Patent No. 364,895, dated June 14, 1887.

Application filed October 26, 1886. Serial No. 217,273. (No model.)

*To all whom it may concern:*

Be it known that we, HUGH C. CANNON and ARTHUR E. McGRATH, of McArthur, in the county of Vinton and State of Ohio, have invented a new and useful Improvement in Adjustable Bulletin-Boards, of which the following is a specification.

Our invention is in the nature of an adjustable bulletin-board especially arranged and designed for use in State and county fairs and in any place where a public display of any business whatever may be desired.

It consists in the peculiar construction and arrangement of parts which we will fully describe with reference to the drawings, in which—

Figure 1:
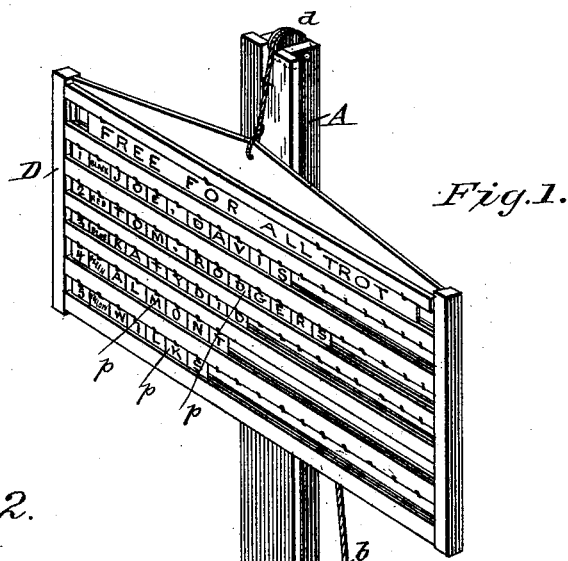
Figure 2:
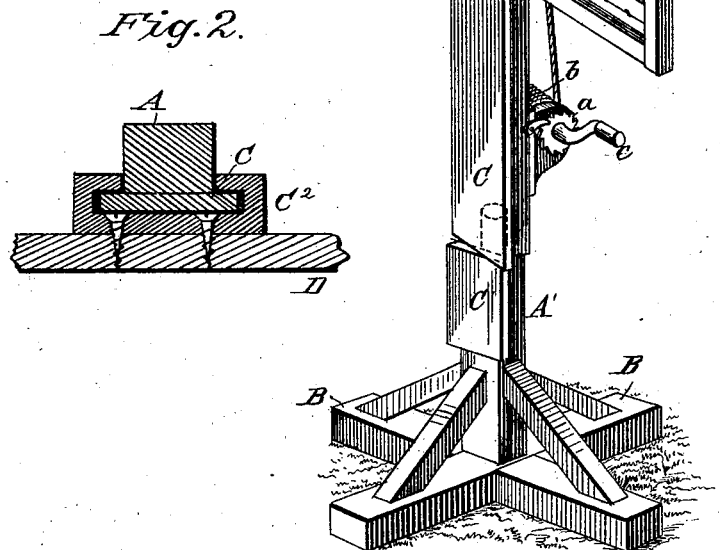
Figure 3:
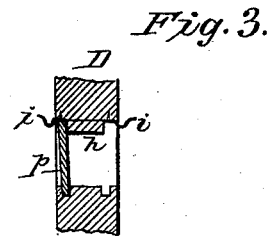

Figure 1 is a perspective view of the entire device. Fig. 2 is a cross-section through the sliding connection of the board to the shaft, and Fig. 3 is a cross-section through the bars which receive the letter-plates.

This improvement consists of a perpendicular shaft, A A', ranging from ten to thirty feet high and from three to twelve inches square, which may be made of a solid beam or of a frame-work, and is mounted upon another frame-work at the base suited in its size to the proportions of the main shaft, and which base B consists of four pieces of timber, of dimensions ranging from three inches to twelve inches square and from three feet to twelve feet long, cut and framed together at their centers so as to bring the upper surfaces to an even plane, at the center of which is mortised and neatly fitted a pivotal post, A', properly braced, as shown, upon which the main shaft A is placed and made to revolve. Upon the one side of the main shaft and pivotal post is placed a guide, C C', made in the form of board strips with metal-faced edges adapted to be brought into coincidence to receive the metal slides C² on the back of the bulletin, for the purpose of conducting the bulletin to the top of the main shaft and maintaining the same in position, as shown in Fig. 2. Upon the opposite side is placed a ratchet-wheel, *a*, winding-drum *b*, and crank *c*, for the purpose of elevating or lowering the bulletin at pleasure, which is done by means of a rope attached to the bulletin-board at its top and passing thence to the top of the main shaft over a pulley, *d*, and thence downward to the drum, whereby the bulletin may be easily adjusted to any point desired.

The bulletin D may be of any desired size— ranging from two by three feet to six by ten feet—suitable to the purpose and place for which it may be desired to be used.

The bulletin-board consists of a neat, light, and handsome frame-work strongly made and bolted together, with spaces or openings of any size suitable for the size of letter-plates *p*, which form the name. For the purposes of a public fair, at the top of the bulletin is placed the name or class of race, and in each successive space is placed the name known to each animal entered for the race, and the colors worn by the riders or drivers, respectively, and each horse is given a number, as appearing on board as Nos. 1, 2, 3, &c. The bulletin is then hoisted and revolved in full view. At finish of each heat the board is lowered and the number opposite each horse is changed only. Thus, if horse No. 1 finishes third in the race, No. 3 is placed opposite his name, and No. 1 opposite the name of the horse finishing first, and so on until all horses' positions are indicated, thereby avoiding the trouble of changing the letters composing the name of each horse, it only being necessary to change the numbers representing the starters in each heat. We also display the time of each heat at the top of bulletin-board in a space especially prepared for that purpose. The bulletin is then again run up and again revolved in full view of the assembled crowd, and thus repeating until the race is ended, when the final result and the winning name is announced with the time in which it was made, thus rendering the bulletin one of the most attractive features of the race-course, tending to give every person interested the most complete and reliable information of the result of each heat as well as the result of the race.

The bulletin-board is made to consist of slats and spaces arranged horizontally, and upon the top edge of each slat is cut a groove or gutter, *g*, one-half inch deep, (see Fig. 3,) and upon the bottom of each section or slat a strip or backing, *h*, is fastened, into which groove and against which strip the letters composing the names and results desired to be announced are placed, the letters being held by springs $i$. The letters are either printed or painted in any fancy colors or plain, as may be desirable, upon sections $p$, of light or thin boards of suitable dimensions to fit the spaces made to receive letters. The letters are placed by first inserting the bottom of the letter in the groove on the top side of the slat and pressing the top of the letter against the strip $h$, and securing it by the spring $i$, where it remains until further announcement is desired to be made, from which position they are easily changed into any other position desired, and again exposed to public view, thus rendering easy and expeditious the interchanging of the results desired to be made, and quickly announcing to the eager and anxious observer the desired information, thereby avoiding the long and tedious manner of painting or printing upon large boards, announcing the same results.

In addition to the above-described uses for this bulletin it will readily appear that it is applicable to a more general use in the advertising of all merchants and grocers. In fact, all business men desiring to call attention to any specific article without the additional cost of printing, writing, or painting the names desired will find use for the same, the most desirable feature of which is that new names may appear for every day, while in the larger cities it may be further utilized by announcing the current prices ruling the market for the day in any of the various branches of trade.

This bulletin is yet possessed of other great and valuable advantages in the peculiar system of its make-up. This system of interchanging of letters and words may with great profit be adopted at all railroad-depots with equal certainty and saving of time. The number or name known to each train, its time due, and point of destination may be printed solid, and the words "late" and "on time" also printed, and inserted, prefixing the minutes late from the single sections or letters or figures, and all being done in less time than the writer could take up his crayon and clean his board. The frame-work composing the base, when used for large bulletins, is set in the earth from four to six feet deep, or any depth sufficient to render the same perfectly safe, while for private advertising bulletins may well be made to set upon casters, or simply set upon the pavement.

In making use of our invention we may construct the board so as to operate by weight—for instance, the main shaft can be constructed by nailing boards together forming a box in which we will suspend a weight (operated on pulley at top) sufficiently heavy to almost equal the weight of bulletin-board, thereby greatly lessening the power necessary to operate the board.

Having thus described our invention, what we claim as new is—

The bulletin herein described, consisting of the pivotal post $A'$ and rotary adjustable shaft $A$, mounted therein, and provided, respectively, with guide-strips $C$ $C'$, in combination with the bulletin $D$, having interchangeable letters, and a drum with ratchet, pulley, and rope for raising and lowering the bulletin, substantially as and for the purpose described.

HUGH C. CANNON.
ARTHUR E. McGRATH.

Witnesses:
B. A. HOOK,
ELMER SPRAGUE.